United States Patent [19]

Hornaman et al.

[11] Patent Number: 5,753,036
[45] Date of Patent: May 19, 1998

[54] POLY(VINYL ALCOHOL) STABILIZED ACRYLIC POLYMER MODIFIED HYDRAULIC CEMENT SYSTEMS

[75] Inventors: E. Chris Hornaman, Allentown; Christopher Thomas Hable, Breinigsville; Randall Paul Bright, Allentown; Richard Henry Bott, Macungie, all of Pa.

[73] Assignee: Air Products and Chemicals, Inc., Allentown, Pa.

[21] Appl. No.: 840,965

[22] Filed: Apr. 21, 1997

[51] Int. Cl.$^6$ .................................................. C04B 26/06
[52] U.S. Cl. .......................... 106/810; 106/724; 106/728; 106/802; 106/823; 524/803; 524/819; 524/823; 524/5; 526/202
[58] Field of Search ................................ 524/803, 819, 524/823, 503, 5; 526/202; 106/810, 724, 728, 823, 802

[56] References Cited

U.S. PATENT DOCUMENTS

| | | | |
|---|---|---|---|
| 2,407,107 | 9/1946 | Smith et al. | 260/32 |
| 3,196,122 | 7/1965 | Evans | 260/29.6 |
| 3,409,578 | 11/1968 | Hwa | 260/29.6 |
| 3,547,853 | 12/1970 | Kalandiak | 260/29.6 |
| 4,670,505 | 6/1987 | Craig | 524/704 |
| 5,519,084 | 5/1996 | Pak-Harvey et al. | 524/503 |

FOREIGN PATENT DOCUMENTS

| | | |
|---|---|---|
| 0538571 | 4/1993 | European Pat. Off. . |
| 0671420 | 9/1995 | European Pat. Off. . |
| 0718314 | 6/1996 | European Pat. Off. . |
| 0723975 | 7/1996 | European Pat. Off. . |
| 1438449 | 6/1976 | United Kingdom . |

*Primary Examiner*—Anthony Green
*Attorney, Agent, or Firm*—Russell L. Brewer

[57] ABSTRACT

Mortar formulations comprising a hydraulic cement and a PVOH stabilized acrylic latex or a spray dried redispersible powder made from the PVOH stabilized acrylic latex are disclosed. These include formulations suitable for use as tile mortars, patching mortars, EIFS base coats and grouts. An acrylic latex that, when formulated with hydraulic cement, has performance advantages over other latex resins in mortar, patch and exterior insulation and finishing systems. The spray dried, redispersible acrylic emulsion polymer that, when formulated with hydraulic cement, has comparable or better performance than a liquid latex in mortars and patches.

12 Claims, No Drawings

POLY(VINYL ALCOHOL) STABILIZED ACRYLIC POLYMER MODIFIED HYDRAULIC CEMENT SYSTEMS

BACKGROUND OF THE INVENTION

This invention relates to mortars comprising a hydraulic cement incorporating an acrylic emulsion that has been stabilized with poly(vinyl alcohol).

Polymer modified hydraulic cement compositions are widely used in industry primarily because extensive investigations of polymer modified hydraulic cement have shown that such polymer modifications of cementitious compositions can improve strength, adhesion, flexibility and workability.

One form of polymer modifier for hydraulic cements has been in the form of aqueous latices or dispersions. Another form has been redispersible powders. One of the significant disadvantages to using a liquid latex is that it requires the end user to mix the liquid polymer composition with the cementitious composition at the job site, thereby requiring a two-component mixture. In addition, the two components have to be packaged separately, a wet container for the latex and a dry container or bag for the cementitious composition. Redispersible, dry polymers have been employed for cement modification and their use is based upon the concept that when the powdered polymer is dry mixed with the cement and aggregate premixture by the manufacturer; at the job site all that is required is the addition of water.

The following patents and publications illustrate the use of both latices and redispersible polymers for uses including the formulation of mortars comprising hydraulic cements.

U.S. Pat. No. 3,409,578 discloses the preparation of a dry cementitious composition modified by an acrylic polymer powder. The acrylic polymer powder is prepared from a latex and contains carboxylate groups in the dispersed polymer, or the dispersing agent for the polymer, or in both. The carboxylate groups may be in the acid form or in the form of a monovalent metal salt or an ammonium salt.

U.S. Pat. No. 3,196,122 discloses cementitious compositions incorporating water-insoluble acrylic polymer emulsions. The polymers are comprised of water based polymers from one of more monomers having the formula:

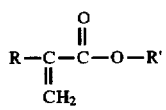

wherein R is selected from the group consisting of hydrogen, the alkyl radicals of the series —$C_nH_{2n+1}$ and the phenyl, tolyl, and benzyl radicals and wherein R' is selected from the same group not including hydrogen.

U.S. Pat. No. 3,547,853 discloses cementitious compositions comprising a dry redispersible acrylic polymer, an aliphatic hydroxycarboxylic acid set-retarding agent that also serves as a sequestrant, and trimethylol propane, trimethylol ethane or a mixture of the latter two compounds. The acrylic polymer may be any water-insoluble emulsion polymer of one or more (meth)acrylic esters or such a polymer containing about 1 to 10 weight % olefinically unsaturated acid.

EPO 0 718 314 discloses the preparation of protective colloid stabilized styrene/(meth)acrylate dispersions for use in powder paints for wood and hydraulically setting building materials. The dispersions are characterized in that at least 50% of the protective colloid and the monomers and up to 50% of the initiator are charged in the form of an aqueous emulsion and eventually the remaining monomers and protective colloid are added at a temperature of 30°–100° C.

EPO 0 671 420 discloses protective colloid stabilized dispersions for use in paints and coatings. The polyacrylate dispersions are characterized as having from 40 to 99.9% alkyl (meth)acrylate and 0.1 to 10% carboxyl functional monomer. Preferably no anionic or nonionic emulsifier is added, the carboxyl functionality being neutralized prior to polymerization.

GB 1,438,449 disclose the use of poly(vinyl alcohol) containing acid or mercaptan groups as a means for stabilizing all acrylic emulsion compositions. In addition, this reference also points out the lack of utility in using conventional poly(vinyl alcohol) as the stabilizer for all acrylic emulsion compositions.

U.S. Pat. No. 2,407,107 discloses a process for producing stable dispersions of alkyl acrylate polymers by an emulsion polymerization process wherein the alkyl acrylate monomers are emulsified in an aqueous solution and polymerized. A water soluble, partially saponified polyvinyl acetate is used as the emulsifying agent and is accompanied with a small amount of a petroleum hydrocarbon such as a mineral oil or wax. The hydrocarbon is employed in an amount from about 0.5–5% based on the weight of alkyl acrylate monomer and is used for enhancing the stability of the emulsion that contains typically from 10–40% by weight of polymerized alkyl acrylate.

EP 0 723 975 discloses the preparation of redispersible powders comprised of styrene and at least one alkyl acrylate and an epoxide group containing monomer from a protective colloid, e.g., a poly(vinyl alcohol) or polyvinylpyrrolidone stabilized latex. The redispersible powders were used in preparing hydraulic cements which had superior adhesive strengths to tiles.

EP 0 538 571 discloses the preparation of protective colloid-stabilized and emulsifier free polymeric dispersions based upon styrene/(meth)acrylate monomers. Vinyl esters and other monomers, e.g., unsaturated carboxylic acids, amides, diolefins, etc. Both latices and redispersible powders were formed.

U.S. Pat. No. 5,519,084 discloses a process of preparing acrylic powders from latices containing a dispersing aid of poly(vinyl alcohol). Acrylic polymers incorporating carboxyl functionality are prepared in the presence of emulsifiers The patentees report the redispersible powders are suited for use as additives to hydraulic cements.

SUMMARY OF INVENTION

This invention relates to improved mortars comprising a hydraulic cement an acrylic polymeric additive. The improvement resides in an acrylic polymeric additive consisting essentially of a poly(vinyl alcohol) (PVOH) stabilized acrylic emulsion or latex and/or redispersible powder made from said emulsion that imparts superior performance to the mortar compared to typical surfactant stabilized acrylic emulsions and/or redispersible powders made from said surfactant stabilized acrylic emulsion polymers. The acrylic polymers are characterized as consisting essentially of acrylic monomers stabilized with a stabilizing system consisting essentially of poly(vinyl alcohol). Representative mortars include tile mortars, patching mortars, exterior insulation and finishing systems (EIFS base coats) and tile grouts which contain either the PVOH stabilized acrylic latex or the spray dried redispersible powder made from the PVOH stabilized acrylic latex. In a preferred embodiment, the formulations are produced utilizing the PVOH acrylic emulsion as a spray-dried redispersible powder.

There are several advantages to the use of the essentially surfactant-free, substantially all acrylic polymer stabilized with poly(vinyl alcohol) that are used in mortars comprising hydraulic cement and a polymeric additive and these include:

- a excellent adhesion of ceramic tile mortars formulated with the PVOH stabilized acrylic emulsions and redispersible powders to wood;
- excellent adhesion under wet conditions;
- excellent retention of strength after wet soaking compared to dry strength;
- excellent resistance to water absorption in an exterior insulation and finishing systems (EIFS) base coat;
- an ability to formulate mortars with an acrylic emulsion having low volatile organic compound level; and,
- excellent ability to form a spray dried, redispersible acrylic emulsion polymer that can be formulated with a hydraulic cement to form mortar, patch and EIFS base coats.

DETAILED DESCRIPTION OF THE INVENTION

This invention pertains to improved mortars comprising hydraulic cements incorporating improved acrylic emulsion compositions. The improvement in these acrylic emulsions resides in effecting the polymerization of the acrylic monomers in the presence of a stabilizer system consisting essentially of poly(vinyl alcohol) having a specified hydrolysis level and in the presence of a chain transfer agent. These emulsions are further characterized in that they are formed from a substantially all acrylic, water insoluble monomer system wherein at least a majority of the acrylic monomer has a carbon content greater than methyl acrylate. In addition, that all acrylic emulsion system is stabilized at high solids, greater than 40% by weight, at concentrations of less than 12% poly(vinyl alcohol) by weight of the emulsion using a stabilizer consisting essentially of poly(vinyl alcohol) selected from the group consisting of substantially fully hydrolyzed poly(vinyl alcohol) and a poly(vinyl alcohol) having a hydrolysis value of at least 86% and a molecular weight of from about 5,000 to 13,000. Hydrolysis levels of less than about 96.5% may be used in low molecular weight poly(vinyl alcohol) whereas use of higher molecular weight poly(vinyl alcohol) leads to instability.

A wide range of acrylic monomers can be used in the polymerization process described herein and they may be used singly or in combination with other acrylic monomers. These ethylenically unsaturated polymerizable $C_1$–$C_8$ alkyl esters of acrylic and methacrylic acid include methyl acrylate, ethyl acrylate, butyl acrylate, 2-ethyl-hexyl acrylate and the corresponding methacrylates. Of these, methyl methacrylate and butyl acrylate are the preferred lower alkyl acrylates used in the polymerization process for producing a variety of polymeric systems suited for such cementitious applications.

Other ethylenically unsaturated monomers may be copolymerized with the acrylic esters. The composition of the resultant copolymer is largely dependent upon the application. Typical monomers include vinyl acetate, acrylamide, methacrylamide, acrylic and methacrylic acid, maleic and fumaric anhydride, styrene and so forth. The slightly more water soluble acrylates that include hydroxy acrylates, e.g., hydroxyethyl acrylate. Glycidyl acrylates may also be copolymerized with the acrylic esters. Monomers other than the acrylic esters should be kept to a minimum in order for the emulsion to be considered an acrylic emulsion, e.g., below about 10% and preferably below 5% by weight of the monomers employed in producing the polymer. The more hydrophilic monomers, i.e., monomers that are more hydrophilic than the methyl methacrylate or butyl acrylate monomers to be polymerized, should be avoided to maintain water resistant properties.

One of the keys to producing a high solids, e.g., greater than 45% by weight all acrylic emulsion without the use of surfactants, solubilizers, and microfluidization techniques resides in the use of a poly(vinyl alcohol) selected from the group consisting of substantially fully hydrolyzed poly(vinyl alcohol) and/or a partially hydrolyzed poly(vinyl alcohol), >86%, as the stabilizing agent where the molecular weight ranges from about 5,000 to 13,000. Low molecular weight poly(vinyl alcohol), i.e., below 13,000 may be used upwards from the 86% hydrolyzed to fully hydrolyzed. The level of poly(vinyl alcohol) utilized as a stabilizer is from about 2 to 12%, preferably from about 3 to about 7% based on the weight of the total monomers polymerized. One type of poly(vinyl alcohol) has a hydrolysis value of at least 96.5%, i.e., 96.5% of the acetate groups in poly(vinyl acetate) are converted to hydroxyl groups. When less than 96.5% of the acetate groups are converted to hydroxyl groups, i.e., the polyvinyl acetate is less than fully hydrolyzed, and the molecular weight is above about 13,000, there is a tendency for a high solids acrylic emulsion formulation to become gritty. As the degree of hydrolysis is reduced substantially below 96.5%, the latex may become unstable. A second type of poly(vinyl alcohol) is a poly(vinyl alcohol) having a hydrolysis value of at least 86% to fully hydrolyzed and a molecular weight within a range of from 5,000 to 13,000. Poly(vinyl alcohol) having lower hydrolysis values and high molecular weights may be acceptable for producing low solids acrylic emulsions as noted by the prior art but they are incapable of producing high solids emulsions at low poly(vinyl alcohol) stabilizer levels.

The molecular weight of the poly(vinyl alcohol) is an important factor in stabilizing the acrylic emulsion. A fully hydrolyzed poly(vinyl alcohol) having a number average molecular weight within a range of from about 5,000 to about 45,000 should be used with a preferred range of from about 15,000 to about 30,000. The lower hydrolysis value poly(vinyl alcohol) may be used provided the molecular weight does not exceed about 13,000.

Blends of fully hydrolyzed poly(vinyl alcohol) may be used with favorable results. One type of blend comprises from 20 to 80%, preferably 50 to 75%, of a low molecular weight (5,000 to 13,000) poly(vinyl alcohol), including 86 to 90% hydrolyzed, and 20 to 80%, preferably 50 to 75%, of a higher molecular weight, e.g., 25,000 to 45,000 molecular weight poly(vinyl alcohol). Another blend may comprise a fully hydrolyzed poly(vinyl alcohol) and a partially hydrolyzed poly(vinyl alcohol) which by itself would have been unacceptable for stabilizing the emulsion. In other words, not all of the stabilizing poly(vinyl alcohol) need be fully hydrolyzed but may contain some lower hydrolyzed material, e.g., a hydrolysis value of from 85 to 90% at a molecular weight greater than 15,000. If some lower hydrolysis material is employed, the level should be monitored closely as the emulsion will become less stable. One may use from about 0 to 25% of such lower hydrolysis poly(vinyl alcohol) but the remainder of the poly(vinyl alcohol) should have a hydrolysis value of at least 98% as the other component of the stabilizer.

Another of the keys in producing a stable, essentially all lower alkyl acrylate containing emulsion lies in the use of a chain transfer agent. These chain transfer agents are incorporated in an amount of from about 0.2 to 3% and, preferably from 0.5 to 1.5%, by weight of the monomers to be polymerized. Representative chain transfer agents include conventional mercaptans such as n-dodecylmercaptan and water soluble chain transfer agents. Typically, these chain transfer agents should have a chain transfer coefficient of at least 0.6 based upon methyl methacrylate.

Another factor that is influential in reducing water absorption in the hydraulic cement is the particle size of the polymer in the acrylic latex. It has been shown that if the weight average diameter particle size as measured by disc centrifuge ranges from 0.2 to 1.15 microns, preferably 0.3 to 0.8 microns, one can enhance the resistance of the mortar to water absorption. Water absorption becomes greater as the particle size diameter increases above about the 1.15 micron level. Conventional methods for controlling particle size in the emulsion can be employed. Representative examples of such methods include initiation temperature, initiator rate and variation of the ratio of stabilizer to monomer at initiation.

Emulsion polymerization of the lower alkyl esters of acrylic and methacrylic acid in the presence of poly(vinyl alcohol) and a chain transfer agent can be carried out using conventional delay addition polymerization techniques or by the conventional batch method. In the delay procedure, which is preferred, from about 10 to 30% of the monomers to be polymerized are added to the polymerization reactor containing a stabilizer and the balance of the monomers added over a period of time. The time for addition may vary but a conventional procedure will add the monomers over a period of from 2 to 8 hours.

As in conventional emulsion polymerization processes the catalyst used is a free-radical forming catalyst such as a peroxide, e.g., t-butyl hydroperoxide, persulfate such as potassium persulfate, ammonium persulfate and the like as well as azo compounds, e.g., 2,2'-azo bis amidino propane hydrochloride and reducing systems such as sodium formaldehyde sulfoxylate and sodium erythrobate. The oxidizing agent is generally employed on an amount of from 0.01 to 1% preferably 0.05 to 0.5% based on the weight of the monomers introduced into the polymerization system. The reducing agent is added as an aqueous system and in the necessary equivalent or stoichiometric amount.

One of the significant advantages of the lower alkyl acrylate emulsions described herein is that they are stabilized with a stabilizing system consisting essentially of the poly(vinyl alcohol), as described, and they do not contain levels of nonionic or anionic surfactants which may adversely affect the properties of the resulting polymer in the formulation of mortars. It is preferred that the acrylic emulsion preferably contain no surfactant and generally less than 0.1% by weight of the emulsion. Property advantages associated with the polymer in the presence of the fully hydrolyzed poly(vinyl alcohol) include those mentioned, supra, and desirable emulsion viscosity. Prior art emulsions having high levels of poly(vinyl alcohol) tend to have large levels of grafting which contributes to process disadvantages associated with undesirable viscosity, and water resistance. The emulsions stabilized with lower levels of poly(vinyl alcohol) provide improvement in these properties.

In the preparation of the polymer dispersions that may be spray dried to yield the polymer powders, the polymer content of the dispersion may vary from 40 to 65 weight % and particularly from 45 to 55 weight %. The polymers generally have glass transition temperatures ($T_g$) of from +50° to −60° C., polymers having a $T_g$ ranging from +35° C. to −25° C. preferably being used.

Spray drying, or atomization, of the aqueous polymer dispersions that contain PVOH can be carried out in a conventional manner well known in the art, in particular using one-material or multi-material nozzles or atomizer disks. The dispersions are generally atomized in a warm air stream in which the water evaporates. Atomization can be carried out under atmospheric or reduced pressure. In general, the temperature of the warm air stream used for spray drying is from 100°–200° C., in particular from 100°–170° C. The dry, redispersible acrylic polymer powders can be separated off in a conventional manner, in particular using cyclones or filtered evaporators.

It may be advantageous in some systems to add an inert filler material such as clay, chalk, talc, silica or other fine sized particles, to reduce the tendency for the redispersible powder to aggregate over long-term storage. The useful range of this filler is from 0–40 weight %, based on the redispersible polymer powder, preferably from 8–30 weight %. The amount and type of inert material used depends on the particular polymer and its $T_g$.

Conventional additives such as post added protective colloids (including hydroxyethyl cellulose and polyvinyl alcohol), and defoamers may be added as desired. Dispersing aids may also be employed and these include sulfonated melamine formaldehydes, lignosulfonate salts, polyvinyl pyrrolidone, poly(vinyl formamide), poly(vinyl amine), poly(allyl amine), copolymers of vinyl alcohol and vinyl amine or allyl amine, hydroxyethylcellulose, poly(meth) acrylic acid, poly(meth)acrylamide and the like.

Preferred redispersible powder formulations in parts by weight per 100 weight parts of redispersible powder are set forth in the following Table A.

TABLE A

Composition Of Redispersible Powders

| Component | Broadest | Preferred | Most Preferred |
|---|---|---|---|
| Latex polymer solids | 20–100 | 70–95 | 78–86 |
| Poly(vinyl alcohol) | 0–30 | 2–15 | 6–10 |
| Clay | 0–50 | 2–15 | 8–12 |

Preferred mortar formulations in parts by weight per 100 weight parts of mortar are set forth in the following Table B.

TABLE B

Mortar Compositions

| Component | Broadest | Preferred | Most Preferred |
|---|---|---|---|
| Inert filler (sand) | 0–90 | 10–89 | 28–78 |
| Hydraulic cement | 8–99.5 | 10–70 | 20–60 |
| Latex polymer solids or redispersible powder | 0.5–30 | 1–20 | 2–12 |

Other typical formulating ingredients in percent by weight are set forth in Table C

TABLE C

Typical Ingredients Used In Mortars

| | |
|---|---|
| Hydraulic cement | 8 to 99.5% including Portland, calcium aluminate types |
| Sand | 0 to 90% |
| Cure accelerators | 0 to 5% |
| Cure retarders | 0 to 5% |
| Rheology modifiers | 0 to 5%, e.g., cellulosics, poly(vinyl pyrrolidinone), polyacrylamide, |
| Water reducers | 0 to 5% e.g., sulfonated melamine formaldehyde or lignosulfonate resins |
| Defoamers | 0 to 5% |
| Polymer (solids) | 0.5 to 30 |

The following examples are provided to illustrate various embodiments of the invention and are not intended to limit the scope thereof. All quantities are in parts by weight unless otherwise specified.

EXAMPLE 1

Preparation of Butyl Acrylate/Methylmethacrylate Emulsions in the Presence of Poly(vinyl alcohol)

General synthesis procedure: A 2 liter jacketed glass reactor equipped with a mixer, condenser, nitrogen purge and feeds for solution addition is used as the polymerization vessel. An aqueous system consisting of an initial charge that consists of water, stabilizing agent, oxidizing agent, a small level (10 to 30%) of monomer and promoter. This mixture is heated to reaction temperature and allowed to equilibrate at the desired temperature. The reaction then is initiated by addition of a small amount of reducing agent. When reaction begins to generate heat, addition of the feeds (delay addition) is commenced. The desired reaction temperature is maintained by heating or cooling the jacket of the reactor and by controlling the addition rate of the delay components. After all of the monomer and initiator solutions are added, the products are maintained at the reaction temperature for 30 to 90 minutes to insure complete conversion of monomer. The products were then cooled to room temperature and removed.

This example illustrates the preparation of a butyl acrylate/methylmethacrylate copolymer emulsion prepared in the presence of poly(vinyl alcohol) A having a number average molecular weight of 6,000 and a degree of hydrolysis of 97.4% as the only stabilizer.

Initial Charge to Reactor

| | |
|---|---|
| Deionized water | 230 gms |
| poly(vinyl alcohol) 10% aqueous solution | 340 gms |
| Monomer mixture (same ratio as below) | 357 gms |
| tert butylhydroperoxide (70% aqueous soln) | 1.0 gms |
| Ferrous ammonium sulfate (1% aqueous soln) | 5 gms |
| acetic acid | 3.9 gms |

Delay Feeds

| Solutions | Amount |
|---|---|
| 1) Deionized water | 323.4 gms |
| Sodium formaldehyde sulfoxylate | 6.6 gms |
| Total | 330 gms |
| 2) Deionized water | 169.5 gms |
| tert butylhydroperoxide | 10.65 gms |

Delay Feeds

| Solutions | Amount |
|---|---|
| (70% aqueous soln) Foamaster VF* | 1.5 |
| Total | 181.65 gms |
| 3) n-butyl acrylate | 383 gms |
| methyl methacrylate | 467 gms |
| n-dodecyl mercaptan | 7 gms |
| Total | 857 gms |

*Foamaster VF is a commercial defoamer.

The reaction was conducted at 70° C. Delay solution 1 was added at a rate of 0.2 gm/min initially followed by an increase to 1.9 gm/min over a 2 hour period. Delay solution 2 was added at a rate of 0.1 gm/min initially then increased to 0.5 gm/min after 15 minutes. The monomer delay solution 3 was added at a rate of 3.3 gm/min. The reaction was complete in 4 hours. The product had the following properties.

| | |
|---|---|
| Unreacted butyl acrylate | 39 ppm |
| Unreacted methyl methacrylate | 133 ppm |
| % Solids | 49.5 |
| Accelerated Sedimentation. | 4.0% |
| pH | 3.2 |
| $T_g$ | 12.1° C. |
| 60 RPM Visc. | 225 cps |
| 12 RPM Visc. | 420 cps |
| 100 mesh grits | 2500 ppm |

Viscosity was measured using a Brookfield LVT instrument.

The emulsion was stable thus showing that high solids, butyl acrylate/methylmethacrylate emulsions could be prepared using poly(vinyl alcohol) as the only stabilizer. Grit levels were modest.

EXAMPLE 2

Preparation of Spray Dried PVOH Acrylic Emulsion

To 90 parts by weight (pbw) solids of an acrylic emulsion prepared in accordance with Example 1, was added 10 pbw Airvol® 523 poly(vinyl alcohol) as an aqueous solution. The polymer mixture was mixed at room temperature and spray dried using conventional techniques at 100° C. to form a fine, free-flowing powder. This powder was readily dispersible in water and the redispersed latex was stable.

EXAMPLE 3

Tile Mortars Prepared Using Conventional Acrylic And Other Polymeric Latexes

A series of tile mortars was prepared using conventional acrylic and other polymeric latices and the Example 2 PVOH stabilized acrylic redispersible powder for the purpose of determining whether any contribution was imparted to such tile mortars by the PVOH stabilized acrylic emulsions or redispersible powder prepared therefrom. In preparing the tile mortar, Type I Portland Cement 400 g, sand (Whitehead Brothers P60 grade) 545 g, calcium formate 10 g, Tylose MH6000xp (Hoechst methyl hydroxy ethyl cellulose) 5 g were mixed as a dry blend. While mixing with a Hobart mixer at speed 1, a blend of latex sufficient to provide 40 parts of dry polymer solids and water so that the sum of water from the latex and the additional water was 120 parts was added to the mix over a period of 30 seconds. An additional 130 g water was slowly added over a period of 1 minute and mixed for a total of 3 minutes. The mortar was then allowed to slake for 5 minutes. The mortar mix was used to bond various combinations of quarry tiles, wall tiles, vitreous tiles, and plywood.

The hydraulic cementitious mortars were tested for adhesion as measured by shear strength in pounds/in$^2$ to a variety of substrates. These included plywood to quarry tile (W/Q), quarry to quarry tile (Q/Q), vitreous tile to vitreous tile (V/V), and wall tile to wall tile (W/W). Testing was conducted after at least 7 days and then again after approximately 7 days water soak. The percent strength retention was calculated. Table 1 sets forth the performance data.

TABLE 1

Performance Data of PVOH-Stabilized Acrylic Latex in a Tile Mortar

| Sample | A | B | C |
| --- | --- | --- | --- |
| Polymer | Airbond ACP-67[1] | Example 1 type[2] | Airflex-323[3] |
| Polymer Stabilizer | Surfactant Stabilized | PVOH Stabilized | PVOH Stabilized |
| Polymer type | Acrylic | Acrylic | VAE |
| Level, g/Kg Dry Weight | 40 | 40 | 40 |
| Tg | 15 | 21 | 20 |
| Density, g/cc | 1.38 | 1.43 | 1.43 |
| W/Q Shear Strength, psi | | | |
| 8 Day Dry | 231 ± 34 | 287 ± 37 | 331 ± 32 |
| Q/Q Shear Strength, psi | | | |
| 9 Day Dry | 419 ± 33 | 475 ± 62 | 390 ± 25 |
| W/W Shear Strength, psi | | | |
| 8 Day Dry | 575 ± 103 | 555 ± 68 | 491 ± 43 |
| 8 + 8 Day Wet | 314 ± 55 | 306 ± 30 | 202 ± 6 |
| Percent retained, % | 54.6 | 55.1 | 41.1 |
| V/V Shear Strength, psi | | | |
| 8 Day Dry | 481 ± 64 | 419 ± 110 | 459 ± 23 |
| 8 + 8 Day Wet | 282 ± 82 | 315 ± 28 | 223 ± 11 |
| Percent retained, % | 58.6 | 75.2 | 48.6 |

[1]Airbond ACP-67 is a surfactant stabilized copolymer of butyl acrylate, methyl methacrylate and acrylic acid commercially available for use as an all acrylic emulsion in the preparation of mortars.
[2]Prepared as described in example 1.
[3]Airflex 323 is a commercial poly(vinyl alcohol) stabilized vinyl acetate-ethylene emulsion.

The PVOH stabilized substantially all acrylic emulsion example (B) shows performance advantages over both the commercial surfactant stabilized substantially all acrylic emulsion (A) and the PVOH stabilized VAE emulsion (C). In comparison to surfactant stabilized acrylic emulsion A, the PVOH stabilized acrylic emulsion B shows superior dry shear strength to plywood (W/Q) and quarry tile to quarry tile, equivalent dry adhesion for wall tiles to wall tiles and slightly lower adhesion for vitreous tiles to vitreous tiles. However, equivalent performance in wet strength was maintained. In comparison to the commercial PVOH stabilized VAE polymer emulsion, the PVOH stabilized all acrylic emulsion B offers higher wet shear strength for both the wall to wall tile assemblies and the vitreous to vitreous tile assemblies with equivalent dry strength. It is further significant that the percent of strength retained for wet versus dry vitreous tiles is improved. Summarizing, the advantages of the PVOH stabilized all acrylic emulsion, one gains the dry strength adhesion afforded with the PVOH stabilized VAE emulsion while retaining the wet strength properties of the commercial acrylic system. Heretofore, one could not fabricate an all acrylic system based upon a PVOH stabilizer without incorporation of surfactants, hydrophilic monomers, etc. all which can adversely effect the properties of the mortar when formulated with the polymer.

EXAMPLE 4

Tile Mortar with Redispersible Powder

A series of tile mortars were prepared and then tested for shear strength for the purpose of comparing the effect of the redispersible powder prepared from the PVOH all acrylic emulsion to other commercial redispersible powders. Type I Portland Cement 400 g, sand (Whitehead Brothers P60 grade) 545 g, calcium formate 10 g, Tylose MH6000xp (Hoechst methylhydroxyethylcellulose) 5 g, and a redispersible powder made by the method described in example 2 from a PVOH stabilized acrylic emulsion polymer having a Tg of 21° C. 40 g were mixed as a dry blend. While mixing with a Hobart mixer at speed 1, water 250 g was slowly added over a period of 1.5 minutes and mixing continued for a total of 3 minutes. The mortar was then allowed to slake for 5 minutes. The mortar mix was used to bond various combinations of quarry tiles, wall tiles, vitreous tiles, and plywood. The results are set forth in Table 2.

TABLE 2

Performance Data of PVOH-Stabilized Acrylic Powder in a Tile Mortar

| Sample | A | B | C |
| --- | --- | --- | --- |
| Polymer Type | VAE Powder[1] | PVOH Stabilized Acrylic Powder[2] | Premix for PVOH Stabilized Acrylic Powder[3] |
| Dry Weight Level g/Kg | | | |
| Powder | 40 | 40 | |
| Premix (Latex solids + PVOH) | | | 35.6 |
| Additional Clay | | | 4.4 |
| Tg | 17 | 21 | 21 |
| Density, g/cc | 1.46 | 1.46 | 1.45 |
| W/Q Shear Strength, psi | | | |
| 7 Day Q/Q Shear Strength, psi | 247 ± 36 | 231 ± 48 | 263 ± 40 |
| 7 Day W/W Shear Strength, psi | 260 ± 30 | 307 ± 27 | 397 ± 12 |
| 7 Day | 444 ± 81 | 453 ± 76 | 493 ± 80 |
| 7 + 7 Day Wet | 186 ± 29 | 252 ± 60 | 257 ± 72 |
| Percent retained, % | 41.9 | 55.6 | 52.1 |
| V/V Shear Strength, psi | | | |
| 7 Day | 430 ± 29 | 372 ± 19 | 424 ± 56 |
| 7 + 7 Day Wet | 197 ± 26 | 246 ± 27 | 256 ± 10 |
| Percent retained, % | 45.8 | 66.1 | 60.4 |

[1]Redispersible Power sold under the trademark Airflex RP 225.
[2]The acrylic emulsion of Example B (Table 1) which has been spray dried.
[3]The acrylic emulsion of Example B (Table 1) which has been modified by post addition of conventional additives needed for obtaining redispersion.

The results in Table 2 demonstrate two important points. First, it shows that the spray dry process, i.e., the conversion of the all acrylic emulsion to premix (C) (compared to Example B in Table 1) or conversion to redispersible powder (B), has a minimal effect on the performance of the polymer. Conversion of a conventional surfactant stabilized emulsion to a powder does not lead to redispersibility and hence significantly adversely affects the performance of the spray dried polymer in mortars. Second, the PVOH stabilized acrylic powder (B) gives a performance advantage in the area of wet shear strengths for wall tile to wall tile and vitreous tile to vitreous tile compared to the commercial VAE powder. The PVOH stabilized redispersible powder (B) provides comparable adhesion to plywood compared to that provided by the VAE redispersible powder (A).

EXAMPLE 5

EIFS Basecoat Testing for Water Resistance

A series of hydraulic EIFS base coats was prepared that incorporated a variety of polymeric additives for the purpose of determining water resistance. The formulation was prepared as follows: Type III Portland Cement 299.1 g, silica sand (70 mesh) 349.0 g, silica flour (200 mesh) 149.6 g, marble dust (#8) 79.8 g, wollastonite (Nyad G) 59.8 g, Bermocoll E411FQ (Berol Nobel) 2.0 g, glass fiber (0.5 in) 1.0 g and a redispersible powder prepared as described in Example 2 from a PVOH stabilized emulsion having a Tg of 17° F. prepared as described in Example 1 59.8 g, were dry mixed until well blended. On a Hobart mixer at speed 1, 254 g water was added over a period of 2 minutes. The mortar was then allowed to slake for 2 minutes. The resulting mortar had a density of 1.63 g/cc.

The samples were tested for adhesion and flexibility. Table 3 sets forth the emulsions and the 24 hour water absorption data (water resistance). The test procedure was as follows:

Water Resistance Testing

Freshly mixed EIFS basecoat was applied to a thin plastic sheet using a template. The template dimensions were 4×4×1/16 inches. A piece of fiberglass mesh commonly used for reinforcement of EIFS basecoats was then imbedded into the basecoat. The samples were allowed to cure for 7 days under constant temperature and humidity conditions of 72° F. and 50% R.H. The samples were weighed carefully and submerged completely under water. At various time periods, the samples were removed from the water, patted dry with a paper towel, weighed and replaced into the water. This procedure was repeated until 24 hr. of water soaking had been achieved.

Using the method described above, several emulsions and redispersible powders were formulated and tested. The results are shown in Table 3.

TABLE 3

Water resistance testing of EIFS basecoats formulated with various polymer modifiers.

| Polymer Type | Stabili- zation | Form | 24 hr Water Absorption (%) | Glass Transition Temperature (°C.) |
|---|---|---|---|---|
| Series I | | | | |
| Acrylic[1] | PVOH | emulsion | 9.27 | 21 |
| Acrylic[2] | surfactant | emulsion | 12.41 | 13 |
| Acrylic[3] | surfactant | powder | 13.34 | 13 |

TABLE 3-continued

Water resistance testing of EIFS basecoats formulated with various polymer modifiers.

| Polymer Type | Stabili- zation | Form | 24 hr Water Absorption (%) | Glass Transition Temperature (°C.) |
|---|---|---|---|---|
| Series II | | | | |
| Acrylic | PVOH | emulsion | 3.41 | 21 |
| Acrylic | surfactant | emulsion | 4.31 | 13 |
| VAE4 | PVOH | powder | 3.71 | −8 |
| Series III | | | | |
| Acrylic | PVOH | powder | 12.80 | 17 |
| Acrylic | PVOH | emulsion | 12.50 | 17 |
| Acrylic | surfactant | emulsion | 13.31 | 13 |
| Series IV | | | | |
| Acrylic | PVOH | emulsion | 5.72 | −14 |
| Acrylic | PVOH + 4% Abex EP-120[5] | emulsion | 8.09 | −14 |
| Acrylic | surfactant | emulsion | 9.44 | 13 |

[1]The acrylic emulsion of Sample B (Table 1).
[2]Acrylic emulsion sold under the trademark ACP-67.
[3]Acrylic emulsion based upon a carboxylated butyl acrylate, methyl methacrylate polymer that has been spray dried. (sold under the trademark Airbond SP 102).
[4]Redispersible power sold under the trademark Airflex RP 245.
[5]The acrylic emulsion of Example B (Table 1) which has been modified by post addition of Abex EP-120 surfactant, thus simulating an all acrylic emulsion polymerized in the presence of a stabilizing system consisting of poly(vinyl alcohol) and surfactant.

The data in the above Table 3 clearly demonstrates the superior performance of the PVOH stabilized all acrylic polymer product whether in emulsion or redispersible form. In Series I above, the PVOH stabilized acrylic emulsion exhibited superior water resistance to the surfactant stabilized acrylic emulsion, as well as the surfactant stabilized acrylic redispersible powder. In Series II, the PVOH stabilized acrylic emulsion is also shown to have superior water resistance to a VAE redispersible powder. In Series III, the PVOH stabilized acrylic emulsion and the redispersible powder made therefrom, both exhibited improved water resistance compared to the surfactant stabilized acrylic emulsion. Series IV demonstrates the negative effect of incorporating surfactant into a PVOH stabilized acrylic system. The unmodified PVOH stabilized acrylic emulsion polymer has superior water resistance.

(It is important to note that comparisons cannot be made between data series because of the variability in the curing of cementitious compositions.)

EXAMPLE 6

EIFS basecoat formulations were prepared and tested in accordance with Example 4 using three different PVOH stabilized all acrylic emulsions. The formulations were tested for water absorption after 2 hours water immersion, the only difference being in the particle size of the polymer in the emulsion.

Table 4 sets forth the conditions and results.

TABLE 4

|  | Particle Size<br>Weight average particle<br>diameter (microns) | 2-hour Water Absorption<br>grams/sq. inch<br>surface area |
|---|---|---|
| Sample 1 | 1.17 | 0.36 |
| Sample 2 | 0.71 | 0.13 |
| Sample 3 | 0.52 | 0.14 |

These data show that optimal performance is achieved when the polymer emulsion is comprised of particles less than 1.17 microns in weight average diameter. Preferably, the weight average diameter is within a range of about 0.3 to 0.8 microns in diameter.

We claim:

1. In a mortar composition comprising a hydraulic cement and a polymeric binder the improvement which comprises:

incorporation of an acrylic polymer formed by the emulsion polymerization of an acrylic monomer system consisting of $C_{1-8}$ lower alkyl esters of acrylic or methacrylic acid in the presence of a stabilizer system consisting of a poly(vinyl alcohol) selected from the group consisting of fully hydrolyzed poly(vinyl alcohol) having a number average molecular weight of from 5,000 to 45,000 and a poly(vinyl alcohol) having a hydrolysis value of at least 86% and a molecular weight of from 5,000 to 13,000, said poly(vinyl alcohol) present in an amount of from 2 to 12% by weight of the resulting emulsion and said polymerization conducted in the presence of from 0.2 to 3% by weight a chain transfer agent having a chain transfer coefficient of at least 0.6 based upon methyl methacrylate, said resulting emulsion having a polymer solids content of at least 40% by weight, and said acrylic polymer having a weight average diameter particle size of from 0.2 to 1.15 microns, as said polymeric binder.

2. The mortar composition of claim 1 wherein the poly(vinyl alcohol) is incorporated in the emulsion in an amount of from about 3 to about 7% by weight of the acrylic monomer system.

3. The mortar composition of claim 2 wherein the mortar composition comprises the following:

| Inert filler | 0–90 |
| Hydraulic cement | 8–99.5 |
| polymer solids | 0.5–30 | in parts by weight per 100 parts by weight of mortar composition.

4. The mortar composition of claim 3 wherein the acrylic polymer has glass transition temperature ranging from –60° to +50° C.

5. The mortar composition of claim 3 wherein the acrylic polymer contains less than 5% by weight of a monomer other than said $C_{1-8}$ lower alkyl ester of acrylic or methacrylic.

6. The mortar composition of claim 4 wherein the acrylic polymer is in the form of a redispersible powder.

7. The mortar composition of claim 6 wherein the acrylic monomers are selected from the group consisting of methyl methacrylate, ethyl acrylate, ethyl methacrylate, butyl acrylate, and 2-ethyl-hexyl acrylate.

8. The mortar composition of claim 6 wherein the glass transition temperature ranges from –25° to +35° C.

9. The mortar composition of claim 7 wherein the acrylic polymer consists essentially of polymerized units of methyl methacrylate and butylacrylate and the chain transfer agent is a mercaptan.

10. The mortar composition of claim 9 wherein the poly(vinyl alcohol) stabilizer employed in the polymerization is a blend containing from 50 to 75% of a low molecular weight (5,000 to 13,000) poly(vinyl alcohol) and having a hydrolysis value of from about 86 to 90% and 25 to 50% of a higher molecular weight 25,000 to 45,000 poly(vinyl alcohol).

11. The mortar composition of claim 6 wherein the weight average particle size diameter of the polymer is from about 0.3 to 0.8 microns.

12. The mortar composition of claim 11 wherein the mortar composition comprises the following:

| Inert filler | 28–78 |
| Hydraulic cement | 20–60 |
| polymer solids | 2–12 | in parts by weight per 100 parts by weight of mortar composition.

* * * * *